United States Patent
Miyamoto et al.

(10) Patent No.: US 6,618,381 B1
(45) Date of Patent: Sep. 9, 2003

(54) NETWORK SYSTEM AND COMMUNICATION NODE

(75) Inventors: Tomofuyu Miyamoto, Kanagawa (JP); Haruo Moritomo, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/164,883

(22) Filed: Oct. 1, 1998

(30) Foreign Application Priority Data

Mar. 13, 1998 (JP) .......................................... 10-063552

(51) Int. Cl.⁷ .............................................. H04L 12/56
(52) U.S. Cl. .................................. 370/395.43; 370/412
(58) Field of Search ............................... 370/395.1, 396, 370/397, 400, 389, 398, 399, 395.2, 395.21, 395.3, 395.42, 395.43

(56) References Cited

U.S. PATENT DOCUMENTS

| | | | | |
|---|---|---|---|---|
| 5,828,653 A | * | 10/1998 | Goss ........................... | 370/230 |
| 5,982,748 A | * | 11/1999 | Yin et al. ..................... | 370/232 |
| 6,005,866 A | * | 12/1999 | Lincoln ........................ | 370/398 |
| 6,108,307 A | * | 8/2000 | McConnell et al. .......... | 370/235 |
| 6,125,119 A | * | 9/2000 | Cherukuri et al. ........... | 370/410 |
| 6,125,123 A | * | 9/2000 | Furuno ......................... | 370/467 |
| 6,147,965 A | * | 11/2000 | Burns et al. ................. | 370/216 |
| 6,195,355 B1 | * | 2/2001 | Demizu ........................ | 370/397 |

* cited by examiner

Primary Examiner—Ken Vanderpuye
(74) Attorney, Agent, or Firm—Katten Muchin Zavis Rosenman

(57) ABSTRACT

An ATM network system which connects a source terminal equipment to a destination terminal equipment by an SVC through a plurality of ATM communication nodes. In the source ATM communication node, a priority level definition table is preset with priority levels for the SVC whose service category is the UBR service per a physical port, MAC address, or IP address, a control unit transmits a SETUP message including the priority levels, a switch controller controls a readout level of a user's information cell based on the priority levels. In each of the ATM communication nodes having received the SETUP message, the switch controller controls a readout level of the user's information cell based on the priority levels included in the SETUP message.

17 Claims, 12 Drawing Sheets

| | | | | | |
|---|---|---|---|---|---|
| Forward Priority Information | Setting Unit | Physical Port | IP Address | MAC Address | ......... |
| | Priority Object | 1. 1. 1 | 164.69.9.100 | 0A-0B-0C-08-05 | ......... |
| | Priority Level | high | high | low | ......... |
| Backward Priority Information | Setting Unit | Physical Port | — | MAC Address | ......... |
| | Priority Object | 1. 1. 1 | — | 0A-0B-0C-08-05 | ......... |
| | Priority Level | high | — | middle | ......... |

FIG.7

| Information Element | Type | Length (Bytes) |
|---|---|---|
| Protocol Discriminator | M | 1 |
| Call Reference | M | 4 |
| Message Type | M | 2 |
| Message Length | M | 2 |
| AAL Parameters | O | 4~21 |
| ABR Additional Parameters | O | 4~14 |
| ABR Setup Parameters | O | 4~36 |
| . | . | . |
| . | . | . |
| . | . | . |
| End-to-End Transit Delay | O | 4~13 |
| Extended QoS Parameters | O | 4~25 |
| . | . | . |
| . | . | . |
| . | . | . |
| QoS Parameter | O | 4~6 |
| Transit Network Selection | O | 4~9 |

M : Mandatory
O : Optional

FIG.8

| | | | |
|---|---|---|---|
| Extended QoS Parameters Information Element Identifier | | | 1 Byte |
| Ext. | Coding Standard | Information Element Instruction Field | 1 Byte |
| Length of Extended QoS Parameters Contents | | | 2 Bytes |
| Length of Extended QoS Parameters Contents (continued) | | | |
| Origin | | | 1 Byte |
| Acceptable Forward Peak-to-Peak Cell Delay Variation Identifier | | | 1 Byte |
| Acceptable Forward Peak-to-Peak Cell Delay Variation | | | 3 Bytes |
| Acceptable Forward Peak-to-Peak Cell Delay Variation (continued) | | | |
| Acceptable Forward Peak-to-Peak Cell Delay Variation (continued) | | | |
| Acceptable Backward Peak-to-Peak Cell Delay Variation Identifier | | | 1 Byte |
| Acceptable Backward Peak-to-Peak Cell Delay Variation | | | 3 Bytes |
| Acceptable Backward Peak-to-Peak Cell Delay Variation (continued) | | | |
| Acceptable Backward Peak-to-Peak Cell Delay Variation (continued) | | | |
| Cumulative Forward Peak-to-Peak Cell Delay Variation Identifier | | | 1 Byte |
| Cumulative Forward Peak-to-Peak Cell Delay Variation | | | 3 Bytes |
| Cumulative Forward Peak-to-Peak Cell Delay Variation (continued) | | | |
| Cumulative Forward Peak-to-Peak Cell Delay Variation (continued) | | | |
| Cumulative Backward Peak-to-Peak Cell Delay Variation Identifier | | | 1 Byte |
| Cumulative Backward Peak-to-Peak Cell Delay Variation | | | 3 Bytes |
| Cumulative Backward Peak-to-Peak Cell Delay Variation (continued) | | | |
| Cumulative Backward Peak-to-Peak Cell Delay Variation (continued) | | | |
| Acceptable Forward Cell Loss Ratio Identifier | | | 1 Byte |
| Acceptable Forward Cell Loss Ratio | | | 1 Byte |
| Acceptable Backward Cell Loss Ratio Identifier | | | 1 Byte |
| Acceptable Backward Cell Loss Ratio | | | 1 Byte |

FIG.9

| | | | |
|---|---|---|---|
| End-to-End Transit Delay Information Element Identifier | | | 1 Byte |
| Ext. | Coding Standard | Information Element Instruction Field | 1 Byte |
| Length of End-to-End Transit Delay Contents | | | 2 Bytes |
| Length of End-to-End Transit Delay Contents (continued) | | | |
| Cumulative Forward Maximum Cell Transit Delay Identifier | | | 1 Byte |
| Cumulative Forward Maximum Cell Transit Delay | | | 2 Bytes |
| Cumulative Forward Maximum Cell Transit Delay (continued) | | | |
| PNNI Acceptable Forward Maximum Cell Transit Delay Identifier | | | 1 Byte |
| PNNI Acceptable Forward Maximum Cell Transit Delay | | | 3 Bytes |
| PNNI Acceptable Forward Maximum Cell Transit Delay (continued) | | | |
| PNNI Acceptable Forward Maximum Cell Transit Delay (continued) | | | |
| PNNI Cumulative Forward Maximum Cell Transit Delay Identifier | | | 1 Byte |
| PNNI Cumulative Forward Maximum Cell Transit Delay | | | 3 Bytes |
| PNNI Cumulative Forward Maximum Cell Transit Delay (continued) | | | |
| PNNI Cumulative Forward Maximum Cell Transit Delay (continued) | | | |
| Network Generated Indicator | | | 1 Byte |

| Information Field for Setting Priority Level | Priority Level | Set Value |
|---|---|---|
| Acceptable Forward Peak-to-Peak Cell Delay Variation | "high" | 877000 |
| | "middle" | 8388608 |
| | "low" | 16777215 |
| Acceptable Backward Peak-to-Peak Cell Delay Variation | "high" | 877000 |
| | "middle" | 8388608 |
| | "low" | 16777215 |

FIG.11

| Input Interface | Output Interface | Cell Transit Delay ($\mu s$) | Cell Delay Variation ($\mu s$) |
|---|---|---|---|
| 622Mbit/s | 622Mbit/s | 15.0 | 1.20 |
| | 156Mbit/s | 18.0 | 2.4 |
| | 1.5Mbit/s | 315.3 | 17539.2 |
| 156Mbit/s | 622Mbit/s | 18.9 | 1.26 |
| | 156Mbit/s | 22.0 | 2.96 |
| | 1.5Mbit/s | 317.2 | 17481.7 |
| 1.5Mbit/s | 622Mbit/s | 516.3 | 17529.4 |
| | 156Mbit/s | 665.1 | 17536.7 |

NETWORK SYSTEM AND COMMUNICATION NODE

BACKGROUND OF THE INVENTION

1. Field of the Invention

The present invention relates to an ATM network system, and in particular to an ATM network system which connects a source (transmitting) terminal equipment to a destination (receiving) terminal equipment through a plurality of ATM communication nodes by the SVC (Switched Virtual Connection) method for establishing or releasing the connection between both of the terminal equipments by a signaling process.

In accordance with a recent development of an ATM network, there have been put into practice not only a network configuration by the PVC (Permanent Virtual Connection) method for establishing a fixed connection between ATM communication nodes prior to the communication but also a network configuration by the SVC method for establishing a connection only for a communication period.

For such an ATM network, a source terminal equipment requires a Quality of Service (QoS) upon establishing a connection, and the network performs a traffic control for assigning resources to guarantee the required QoS. This traffic control is important to efficiently use the network.

2. Description of the Related Art

FIG. 12 illustrates an arrangement of a general ATM network system, in which a source terminal 1 and a destination terminal 2 are mutually connected through ATM communication nodes 3a–3c (hereinafter generally designated by reference numeral 3).

FIG. 13 illustrates an arrangement of a prior art ATM communication node 3, which is composed of a physical interface unit 4 connected to external ATM communication nodes and a SW (switch) control unit 5 connected to the physical interface unit 4.

If the network shown in FIG. 12 is set up by the PVC method, a PVC is set up which preliminarily designates as a parameter a priority level depending on a command input in advance of the communication.

Then, the source terminal 1 transmits a user s information cell, a frame, a datagram or the like to the ATM communication node 3a.

In the ATM communication node 3a, the user's information cell is inputted from the physical interface unit 4 to the SW-control unit 5 (see FIG. 13), in which the user's information cell is subject to a traffic control according to the designated priority level and is transferred from the physical interface unit 4 to the next ATM communication node 3b. Likewise, the user's information cell is subject to a traffic control according to the designated priority level in the ATM communication nodes 3b, 3c and is transferred to the destination terminal 2.

The service categories set in the ATM network are as follows:

① CBR service: Constant Bit Rate service
② VBR service: Variable Bit Rate service
③ ABR service: Available Bit Rate service It is to be noted that the VBR service includes rt-VBR service (real time-Variable Bit Rate service) and nrt-VBR (non real time-Variable Bit Rate service). It is also to be noted that the UBR service has a connection priority level lower than the other service categories because of soft requirements with regard to the traffic characteristics.

Upon establishing, i.e. setting up a PVC, each of the ATM communication nodes determines whether or not it is possible to accept the connection of the required service category depending on its buffer size, the link capacity, and how the resource of connection is used. If possible, a connection which is assigned a resource such as a buffer or a link band is set up.

FIG. 14 illustrates an arrangement of the SW control unit 5, in which a buffer 51 is composed of a CBR/rt-VBR buffer 51a, an irt-VBR buffer 51b, and a UBR buffer 51c per a service category, the buffers 51a–51c being connected to a readout controller 52.

To the interface unit of the ATM communication node, is given the connections of the aforementioned service categories as multiplexed. The user's information cell of each of the connections is inputted to the CBR/rt-VBR buffer 51a, the nrt-VBR buffer 51b, or the UBR buffer 51c corresponding to the service category.

The readout controller 52 is provided with an available band on the interface to perform a readout control for the user's information cell. As a result, the quality of service of the user's information cell as read out can meet the requirement of the traffic characteristic.

On the other hand, if the network is set up by the PVC method, it is possible to layer the priority levels of the connection by receiving the priority levels as a parameter upon setting up the connection in advance of the communication. For example, by designating the priority levels of the connection with a command input upon setting up a PVC, it is possible to layer the priority levels also for the UBR communication connection.

Including an LAN emulation service integrating the existing LAN into the ATM network, a number of services or applications which enable an LAN system communication through the ATM network are based on the SVC method. For the ATM service category, the UBR service is generally used.

However, if the ATM network is set up by the SVC method, since it is not easy for the user to set the priority levels per each connection, a prior art ATM network system by the SVC method does not layer the priority levels in the UBR communication connection.

SUMMARY OF THE INVENTION

It is accordingly an object to provide an ATM network system connecting a source terminal equipment to a destination terminal equipment through a plurality of ATM communication nodes by the SVC method wherein the priority levels for the UBR communication connection can be easily layered.

[1] For the achievement of the above object, in an ATM network system according to the present invention, an ATM communication node adjacent to a source terminal equipment comprises a priority level definition table in which priority levels for an SVC whose service category is the UBR are preset per a physical port, a control unit which transmits a SETUP message including the priority levels when the SVC is set up, and a switch controller for controlling a readout level of a user's information cell based on the priority levels; each of ATM communication nodes having received the SETUP message comprising a switch controller which controls a readout level of the user's information cell of the SVC based on the priority levels included in the SETUP message.

Namely, in FIG. 1A, a priority level definition table 8 provided in an ATM communication node 3a (hereinafter occasionally referred to as a source ATM communication node) adjacent to a source terminal equipment is preset with priority levels per a physical port. A control unit (not shown) of the ATM communication node 3a having received a user's information cell of the UBR service retrieves the definition table 8 to recognize the priority levels from the physical port (accommodation position) which has received the user's information cell, so that a SETUP message 7b including the priority levels as an information element is transmitted for a communication request.

In FIG. 1A, a repeating ATM communication node 3b determines the priority levels of the UBR service from the information element in the received SETUP message 7b. Then the ATM communication node 3b transfers the received SETUP message 7b as a SETUP message 7c. The same operations will be repeated until an ATM communication node 3c adjacent to a destination terminal equipment receives the SETUP message.

In FIG. 1C, is illustrated an operation example in which a user's information cell 9 is transferred through the SVC of the UBR service set up between the source terminal 1 and the destination terminal 2.

Switch controllers 52 in the ATM communication nodes 3a–3c control reading out the user's information cell 9 from cell buffers (not shown) according to the priority levels.

As a result, the priority levels of the SVC with the service category of the UBR service can be layered per a physical port.

[2] In the above invention [1], the ATM communication node adjacent to the source terminal equipment may have a multi-layer processing portion used in MAC address, and the priority level definition table may be set per MAC address instead of physical port.

Namely, in FIG. 1A, the priority level definition table 8 may be preset with the priority levels per MAC address. The ATM communication node 3a having received a frame of the UBR service retrieves, in a multi-layer processing portion (not shown), the definition table 8 to recognize the priority levels corresponding to the source or destination MAC address, so that the SETUP message 7b having the priority levels as an information element can be transmitted.

As a result, the priority levels of the SVC with the service category of the UBR service can be layered per MAC address.

[3] In the above invention [1], the ATM communication node adjacent to the source terminal equipment may have a multi-layer processing portion used in IP address, and the priority level definition table may be set per IP address instead of physical port.

Namely, in FIG. 1A, the priority level definition table 8 may be preset with the priority levels per IP address. The ATM communication node 3a having received a datagram of the UBR service makes reference to the definition table 8 in the multi-layer processing on to recognize the priority levels corresponding to the source or destination IP address, so that the SETUP message 7b having the priority levels as an information element can be transmitted.

As a result, the priority levels of the SVC with the service category of the UBR service can be layered per IP address.

[4] In any one of the above inventions [1]–[3], the SETUP message may be based on a signaling protocol prescribed by the PNNI (Private Network Network Interface), and the priority levels may correspond to predetermined values set in an Extended QoS Parameter which is an information element in the SETUP message.

In FIGS. 1A and 1B, a signaling process between the ATM communication nodes 3a–3c may be carried out by the adoption of signaling protocol prescribed by the PNNI. Predetermined values corresponding to the priority levels may be set for a communication request in the Extended QoS Parameter which is an information element of the SETUP message according to the protocol.

Namely, the Extended QoS Parameter is an information element, which is not terminated in the ATM network system, is related to a transmission quality such as delay or fluctuation, and has an information field the user can freely set.

Therefore, the ATM communication node transmits the SETUP message 7b in which values corresponding to the priority levels are set in the information element. The ATM communication nodes 3b, 3c having received the SETUP message 7b can determine the priority levels of the connection depending on numerical values set in the Extended QoS Parameter.

As a result, by using an in-message information element of the standard protocol, the priority levels can be layered also for the SVC in which a traffic parameter regarding a service guarantee whose service category is the UBR service is not prescribed.

[5] In the above invention [4], the priority levels may be set in an End-to-End Transit Delay which is an information element in the SETUP message instead of the Extended QoS Parameter.

Namely, the End-to-End Transit Delay is an information element, which is not terminated in the ATM network system, is related to a transmission quality such as delay, and has an information field the user can freely set in the same manner as the extended QoS parameter.

Accordingly, in FIGS. 1A and 1B, the signaling process between the ATM communication nodes 3a–3c may be carried out under the signaling protocol prescribed by the PNNI. Predetermined values corresponding to the priority levels may be set for a communication request in End-to-End Transit Delay which is an information element in the SETUP message in the protocol.

The ATM communication nodes 3b, 3c having received the SETUP message determine the priority levels of the connection depending on the numerical values set for the End-to-End Transit Delay.

As a result, by using the in-message information element of the standard protocol, the priority levels can be layered also for the SVC in which a traffic parameter regarding a service guarantee whose service category is the UBR service is not prescribed.

[6] In any one of the above inventions [1]–[3], the priority level definition table may be set by a command input from a setting terminal connected to the ATM communication node adjacent to the source terminal equipment.

Namely, in FIG. 1A, being connected to the source ATM communication node 3a, a setting terminal 6 can easily set and modify the priority level definition table 8.

[7] In any one of the above inventions [1]–[3], the switch controller may have a weighted round robin scheduler which weights a readout of the user's information cell of the SVC corresponding to the priority levels and sequentially reads out the user's information cell.

FIG. 2 illustrates an operation example of a cell buffer 51 and the switch controller 52 (see FIG. 1C). The cell buffer 51 is composed of cell buffers 51a–51c, and the switch controller 52 includes a weighted round robin scheduler 54.

In FIG. 2A, the user's information cell is temporality stored in the cell buffers 51a–51c respectively, corresponding to priority levels "high", "middle", and "low". The scheduler 54 can read out the user's information cell in accordance with the weight corresponding to the priority levels from the cell buffers 51a–51c.

FIG. 2B schematically illustrates the above readout operation. That a readout weight is set according to the priority levels means that the switch controller 52 prepares an available band for the readout control at the rates corresponding to the priority levels for reading out the cell from the cell buffer 51.

As a result, in the available band a valid cell with a lower priority level can be also read out even in the presence of a valid cell with a higher priority level.

[8] In any one of the above inventions [1]–[3], each ATM communication node may further comprise a connection/priority level table in which the priority levels are set per SVC.

Namely, when setting an SVC with the SETUP message, each of the ATM communication nodes can set the priority levels per SVC in a connection/priority level table.

As a result, each of the ATM communication nodes can make reference to the connection/priority table to easily recognize the priority levels of the connection.

BRIEF DESCRIPTION OF THE DRAWINGS

FIG. 7 is a format chart of a SETUP message prescribed by the PNNI used in the present invention;

FIG. 8 is a format chart of an Extended QoS Parameter information element used in the present invention;

FIG. 9 is a format chart of an End-to-End Transit Delay information element used in the present invention;

FIG. 11 is a table chart illustrating measurements of a Cell Transit Delay and a Cell Delay Valuation in an ATM switch;

Throughout the figures, like reference numerals indicate like or corresponding components.

DESCRIPTION OF THE EMBODIMENTS

Figure 1A:
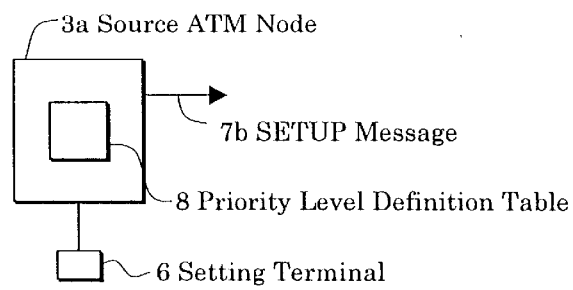
FIGS. 1A–1C are block diagrams schematically illustrating operations of an ATM network system according to the present invention.
Figure 1B:
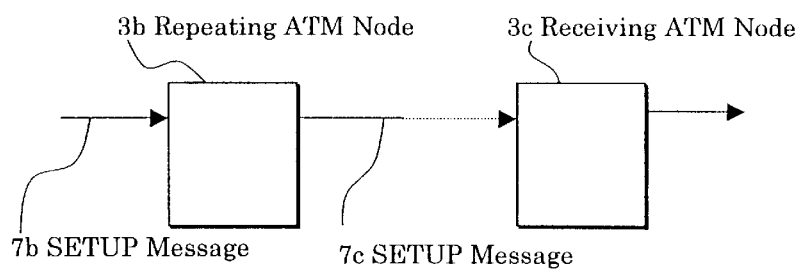
Figure 1C:
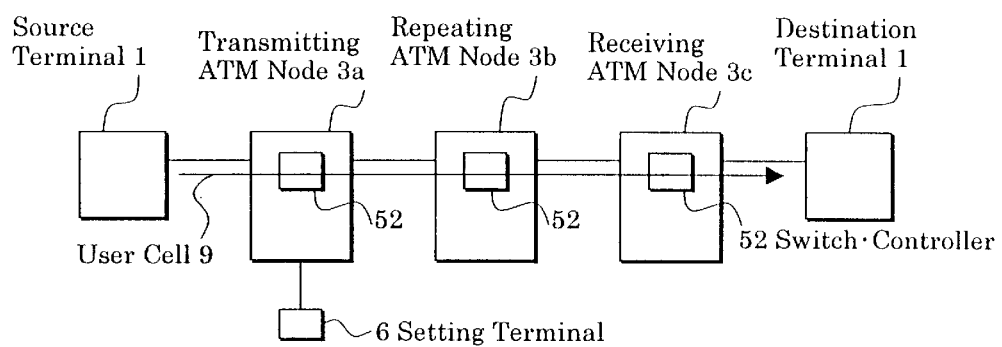
Figure 2A:
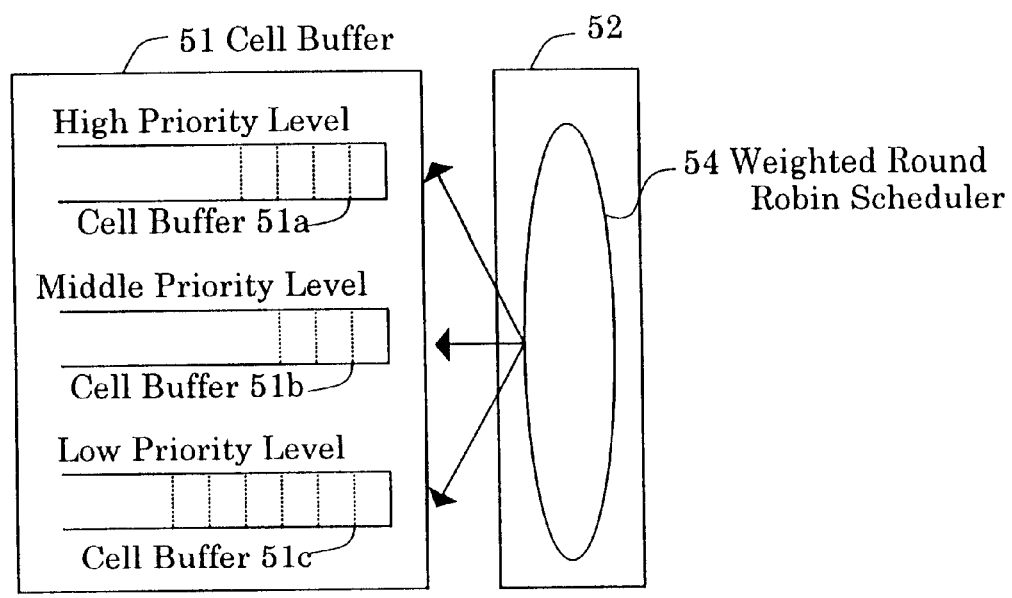
FIGS. 2A and 2B are block diagrams schematically illustrating operations of a cell buffer and a switch controller according to the present invention.
Figure 2B:
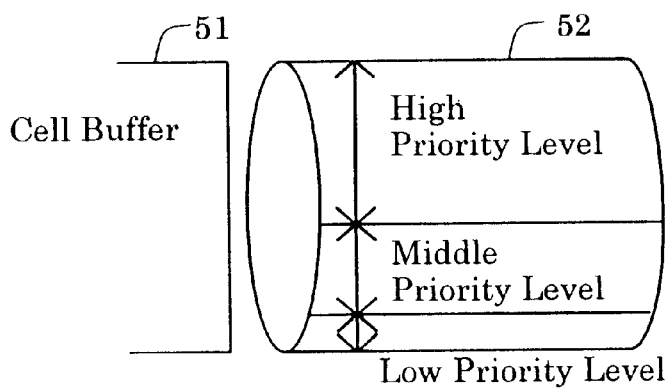
Figure 3A:
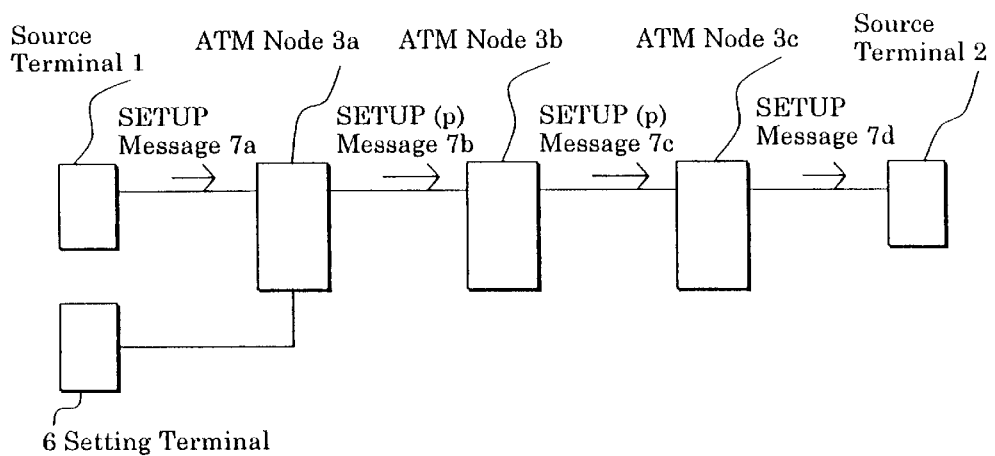
FIGS. 3A and 3B are block diagrams illustrating an embodiment of an ATM network system according to the present invention.

FIG. 3 shows an embodiment of an ATM network system according to the present invention. Particularly, FIG. 3A shows a whole arrangement of the ATM network system, in which the source terminal 1 and the destination terminal 2 are mutually connected through the ATM communication nodes 3a–3c and the setting terminal 6 is connected to the ATM communication node 3a, as shown in FIG. 1C.

It is to be noted that the source terminal 1 may be an LAN equipment such as a switching hub, a router or an ATM-converting equipment such as a CLAD equipment.

Figure 3B:
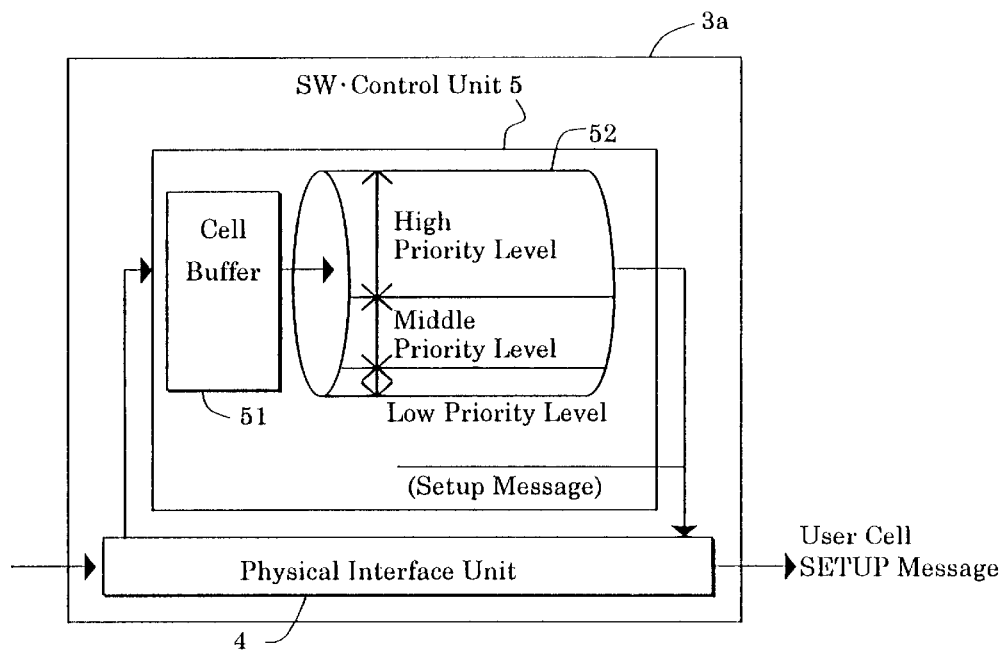

FIG. 3B specifically illustrates an arrangement of the source ATM communication node 3a in which a physical interface unit 4 for inputting/outputting a signal from/to the outside is connected to an SW control unit 5 wherein the cell buffer 51 connected to the physical interface unit 4 is connected to the switch controller 52.

Figure 4:
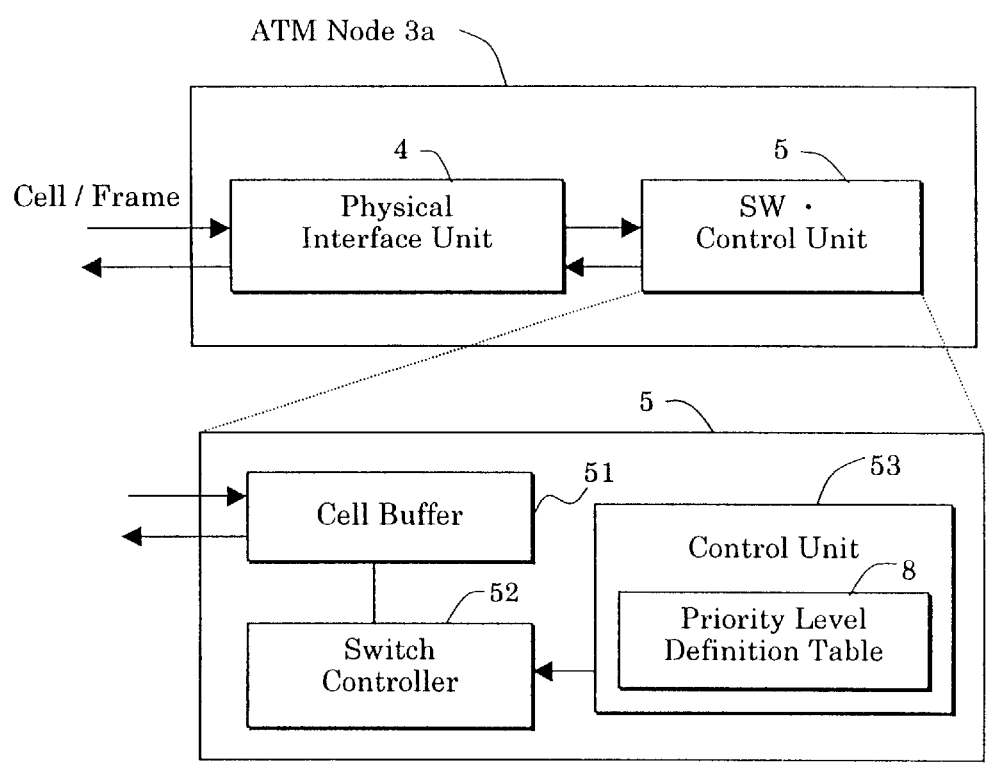
FIG. 4 is a block diagram illustrating an embodiment of a source ATM communication node according to the present invention.

FIG. 4 illustrates in detail an arrangement of the source ATM communication node 3a. This arrangement is different from that of FIG. 3B in that the controller 52 is further connected to a control unit 53 and the priority level definition table 8 is included in the control unit 53.

It is to be noted that different from FIG. 4, the switch controller 52 shown in FIG. 3B is connected between the cell buffer 51 and the physical interface unit 4. This is to specifically illustrate that the switch controller 52 functions to set an available band for reading out the cell from the cell buffer 51.

Hereinafter will be described an operation of the ATM network system according to this embodiment.

In FIG. 3A, the priority level definition table 8 (see FIG. 4) within the control unit 53 of the source ATM communication node 3a is set with priority levels by the user's command input from the setting terminal 6 in advance of the commencement of communication.

Figure 5:
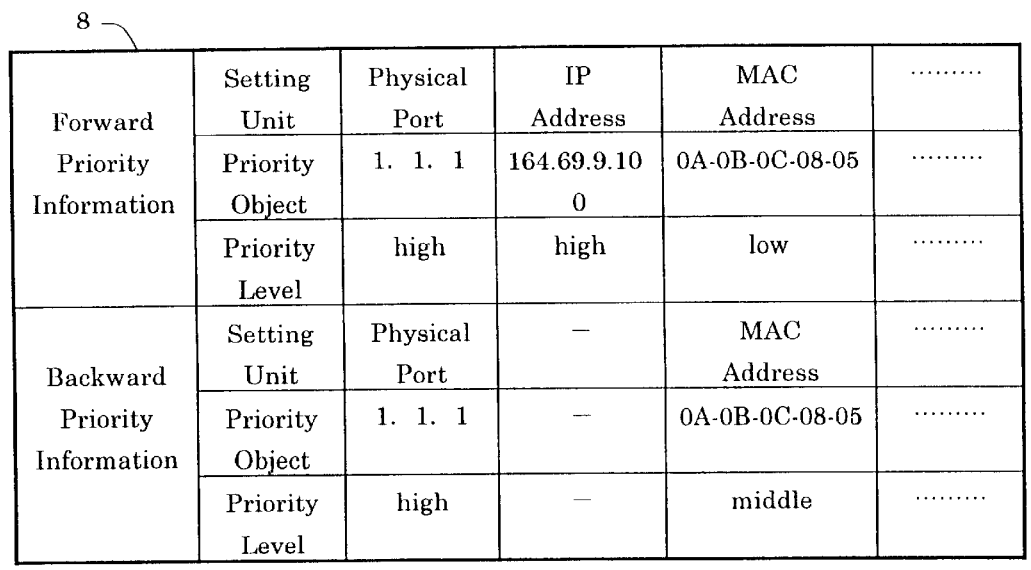
FIG. 5 is a chart illustrating an embodiment of a priority level definition table according to the present invention.

FIG. 5 illustrates an example of the priority level definition table 8, in which "priority information" is composed of "setting unit", "priority object" and "priority level". Furthermore, "priority information" is settable per forward direction and backward direction. The kind of "setting unit" comprises "physical port", "MAC address" and "IP address".

"Priority object" indicates a port number when "setting unit" is "physical port", an MAC address number when "setting unit" is "MAC address", and an IP address number when "setting unit" is "IP address". The kind of "priority level" comprises "high", "middle", and "low".

While in this example the priority levels have three, it is needless to say that the priority levels may have two or be extended more than four.

Also, by changing the composition of "priority information", the kind of "setting unit" or the like in the priority level definition table 8, it is made possible to set priority levels different from this example.

In FIG. 3A, when the ATM communication node 3a receives a cell, a frame, a datagram, or a SETUP message, e.g. the SETUP message 7a in FIG. 3A, from the source terminal 1, the node 3a transmits the SETUP message 7b including the priority level of the connection required by the message to the repeating ATM communication node 3b. It is to be noted that in FIG. 3A, the SETUP messages 7b, 7c are illustrated as SETUP (P: priority level) messages 7b, 7c to indicate the inclusion of the priority level information.

Figure 6:
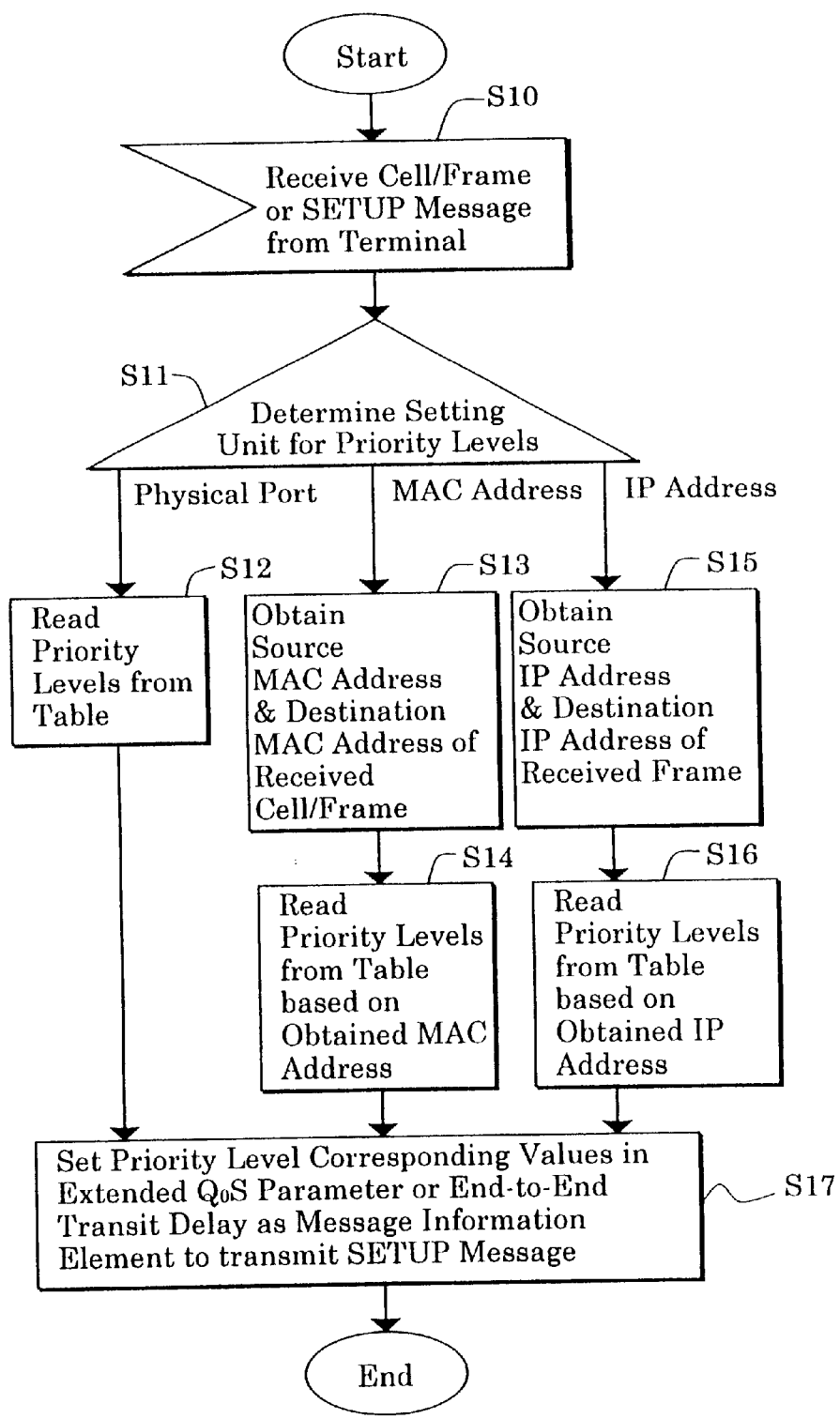
FIG. 6 is a flow chart illustrating an operation example of a source ATM communication node according to the present invention.

FIG. 6 illustrates an operation procedure in which the ATM communication node 3a transmits the SETUP message 7b. Having received a cell, a frame, a datagram, or a SETUP message (at step S10), the node 3a determines "setting unit" for the priority levels (at step S11).

When "setting unit" is "physical port", the priority level definition table 8 (see FIG. 5) is retrieved from the "physical port" and the port number of the receiving port, e.g."1.1.1" to read out the priority level "high" in the forward and backward directions (at step S12).

When "setting unit" is "MAC address", the source MAC address of the received cell/frame, e.g."0A-0B-0C-0D-08-05" is obtained (at step S13). The definition table 8 is retrieved from "MAC address" and "0A-0B-0C-0D-08-05" to read out the priority level "low" in the forward direction and the priority level "middle" in the backward direction (at step S14).

When "setting unit" is "IP address", the source IP address of the received frame, e.g. "164.69.9.100" is obtained (at step S15). The definition table 8 is retrieved from "IP address" and "164.69.9.100" to read out the priority level "high" in the forward direction (at step S16).

The control unit 53 (see FIG. 4) sets the values corresponding to the priority levels read out at steps S12, 14 and 16 in the Extended QoS Parameter or the End-to-End Transit Delay which is an information element in the SETUP message 7b (see FIG. 3A) and transmits them from the physical interface unit 4 (see FIG. 4)(at step S17).

Furthermore, the control unit 53 registers the priority levels corresponding to the connection in a connection/priority level table (not shown) in which a connection management table is added with the priority level information.

In FIG. 3A, the ATM communication node 3b having received the SETUP massage 7b registers the priority level information included in the message and corresponding to the connection in a connection/priority level table (not shown) in its node. Furthermore, the node 3b transfers the SETUP message 7c having the same priority level information as the SETUP message 7b to the ATM communication node 3c.

The node 3c having received the SETUP message 7c executes the same operation as the node 3b and registers the priority levels in the connection/priority level table.

As a result, through the ATM communication nodes 3a–3c, the SVC having designated the priority levels is now set up. Hereafter, the user's information cell and the like transmitted from the source terminal 1 carries the connection at the designated priority level to the destination terminal 2.

FIG. 7 illustrates a format of a SETUP message such as the SETUP messages 7b–7c having the signaling protocol prescribed by the PNNI.

The information elements of this message are composed of Protocol Discriminator, Call Reference, Message Type, Message Length, AAL Parameters, ABR Additional Parameters, ABR Setup Parameters, End-to-End Transit Delay, Extended QoS Parameters, QoS Parameter, and Transit Network Selection. The "types" of "M" and "O" mean "Mandatory" and "Optional" respectively, and the "length" indicates a byte number of each information element.

FIG. 8 illustrates a format of the Extended QoS Parameter which is an information element of the SETUP message shown in FIG. 7.

This parameter is composed of Extended QoS Parameters Information Element Identifier (1 byte), Ext./Coding Standard/Information Element Instruction Field (1 byte), Length of Extended QoS Parameters Contents (2 bytes), Origin (1 byte), Acceptable Forward Peak-to-Peak Cell Delay Variation Identifier (1 byte), Acceptable Forward Peak-to-Peak Cell Delay Variation (3 bytes), Acceptable Backward Peak-to-Peak Cell Delay Variation Identifier (1 byte), Acceptable Backward Peak-to-Peak Cell Delay Variation (3 bytes), Cumulative Forward Peak-to-Peak Cell Delay Variation Identifier (1 byte), Cumulative Forward Peak-to-Peak Cell Delay Variation (3 bytes), Cumulative Backward Peak-to-Peak Cell Delay Variation Identifier (1 byte), Cumulative Backward Peak-to-Peak Cell Delay Variation (3 bytes), Acceptable Forward Cell Loss Ratio Identifier (1 byte), Acceptable Forward Cell Loss Ratio (1 byte), Acceptable Backward Cell Loss Ratio Identifier (1 byte), and Acceptable Backward Cell Loss Ratio (1 byte). Particularly, the user can freely set "Acceptable Forward/Backward Peak-to-Peak Cell Delay Variation".

FIG. 9 illustrates a format of "End-to-End Transit Delay" which is an information element of the SETUP message shown in FIG. 7.

This transit delay is composed of End-to-End Transit Delay Information Element Identifier (1 byte), Ext./Coding Standard/Information Element Instruction Field (1 byte), Length of the End-to-End Transit Delay Contents (2 bytes), Cumulative Forward Maximum Cell Transfer Delay Identifier (1 byte), Cumulative Forward Maximum Cell Transfer Delay (2 bytes), PNNI Acceptable Forward Maximum Cell Transfer Delay Identifier (1 byte), PNNI Acceptable Forward Maximum Cell Transfer Delay (3 bytes), PNNI Cumulative Forward Maximum Cell Transfer Delay Identifier (1 byte), PNNI Cumulative Forward Maximum Cell Transfer Delay (3 bytes) and Network Generated indicator (1 byte). Particularly, the user can freely set "PNNI Acceptable Forward Maximum Cell Transit Delay".

At step S17 in FIG. 6, the values corresponding to the priority levels are set in "Acceptable Forward Pear-to-Peak Cell Delay Variation" and "Acceptable Backward Peak-to-Peak Cell Delay Variation" which is the information field of the Extended QoS Parameter shown in FIG. 8, or "PNNI Acceptable Forward Maximum Cell Transit Delay" which is the information field of the End-to-End Transit Delay shown in FIG. 9.

Figures 10, 14:
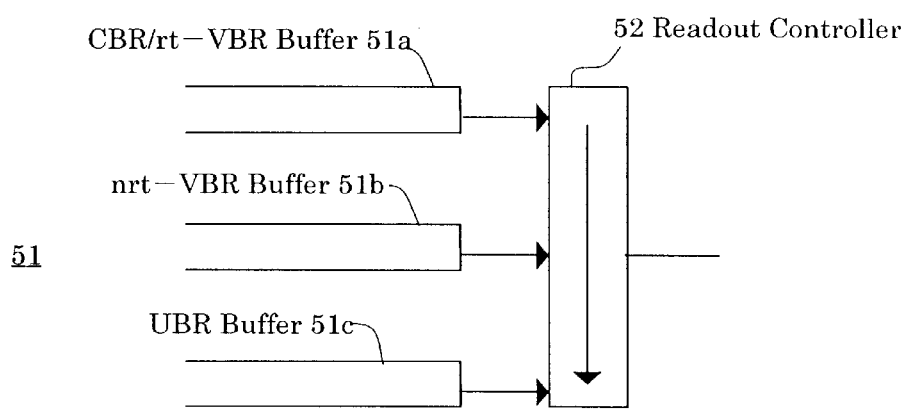
FIG. 10 is a table chart illustrating values set in an Extended QoS Parameter corresponding to priority levels in the present invention.
FIG. 14 is a block diagram illustrating an arrangement of a buffer and a readout controller in a prior art ATM communication node.
Figure 12:
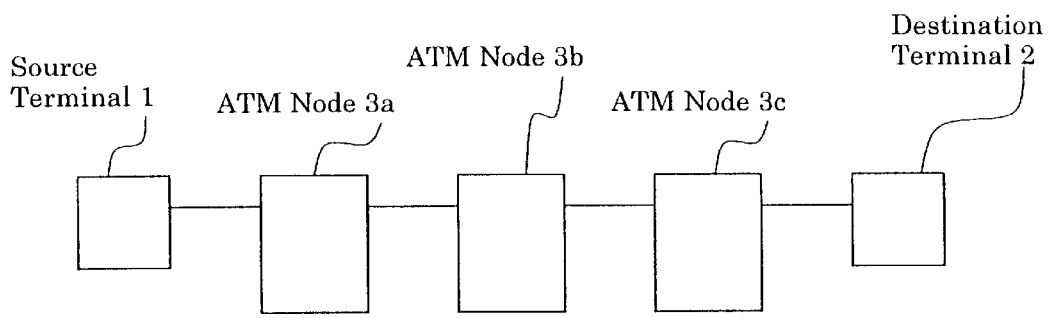
FIG. 12 is a block diagram illustrating an arrangement of a general ATM network system.
Figure 13:
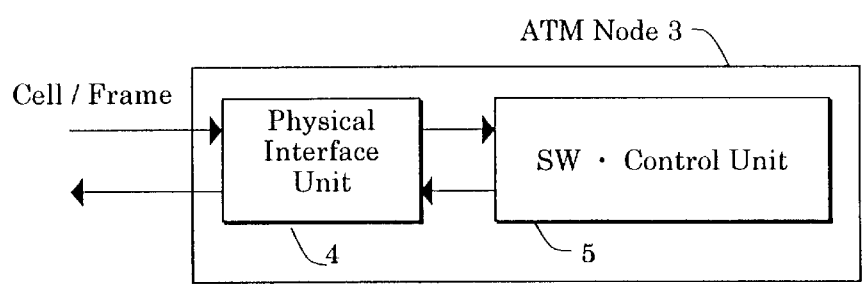
FIG. 13 is a block diagram illustrating an arrangement of a prior art ATM communication node.

FIG. 10 illustrates a table of the values corresponding to the priority levels set in the Extended QoS Parameter. In the information field of "Acceptable Forward Peak-to-Peak Cell Delay Variation", and "Acceptable Backward Peak-to-Peak Cell Delay Variation, the priority levels "high", "middle" and "low" of the forward and backward priority level information (see FIG. 5) are set with the corresponding values of "877000", "8388608" and "16777215".

In the information field of "PNNI Acceptable Forward Maximum Cell Transit Delay" of "End-to-End Transit Delay", values are set with reference to the same table. It is to be noted that the priority levels of the connections in the forward and backward directions are set to have the same value.

As a result, by using thePNNI in-message information element which is the standard protocol, any priority level even for the SVC whose service category is the UBR service can be layered.

FIG. 11 shows measurements of the Cell Transfer Delay and Cell Delay Variation in an ATM switch. Based on the measurements, one exampled method for determining set values corresponding to the priority levels will be described in the following.

It is assumed that the field for setting numerical values corresponding to the priority levels be the Extended QoS Parameter, and the priority levels have three "high", "middle", and "low". It is also considered that 50 ATM switch boards lie between end terminals. Since "Acceptable Forward Peak-to-Peak Cell Delay Variation" and "Acceptable Backward Peak-to-Peak Cell Delay Variation" in the Extended QoS Parameter are composed of 24 bits respectively, so that the settable value ranges from 0 to 16777215.

In the worst case shown in FIG. 11, the cell transit variation in the ATM switch boards between the end terminals is 17539.2×50=876960. Having received the SETUP message, the ATM communication node adds the Cell Delay Variation to "Cumulative Forward Peak-to-Peak Cell Delay Variation" and "Cumulative Backward Peak-to-Peak Cell Delay Variation", which are then compared with "Acceptable Forward Peak-to-Peak Cell Delay Variation" and "Acceptable Backward Peakto-Peak-Cell Delay Variation".

As a result, if the formers are larger than the latters, it means that "Cumulative Cell Transit Variation" exceeds an allowance in the corresponding ATM communication node. In this case, since the quality requirement with regard to the cell transit variation can not be maintained, the transfer of the SETUP message in excess of the allowance will be refused.

If the set values for "Acceptable Forward/Backward Peak-to Peak Cell Delay Variation" are reduced, the requirement with respect to the cell delay variation will become severe and the priority levels will become higher. For this reason, it is necessary to have at least a set value more than the above mentioned calculated value.

Therefore, in view of the errors, a value which is somewhat larger than the above numerical value should be a set value if the priority level is "high". For the set value in the case the priority level is "middle", the set value should be e.g. the half of the settable value. The set value in case the priority level is "low" should be the settable maximum value. Also in the case the field for setting the numerical values corresponding to the priority levels is assumed to be "End-to-End Transit Delay", similar numerical values can be determined. The set values shown in FIG. 10 are determined as mentioned above.

As described above, an ATM network system according to the present invention is arranged so that in a source ATM communication node, a priority level definition table is preset with priority levels for the SVC whose service category is the UBR service per a physical port, MAC address, or IP address, a control unit transmits a SETUP message including the priority levels, a switch controller controls a readout level of a user's information cell based on the priority levels, and in each ATM communication node having received the SETUP message, the switch controller controls a readout level of the user's information cell based on the priority levels included in the SETUP message. Therefore, it becomes possible to easily layer the priority levels with respect to the UBR communication connection.

Also, since the SETUP message of a signaling protocol prescribed by the PNNI which is the standard protocol is adopted, the priority levels can be easily and logically layered for the SVC with the service category of the UBR service without introducing a new protocol.

What is claimed is:

1. A network system, which connects a source terminal equipment to a destination terminal equipment by a connection, comprising:

a first communication node; adjacent to the source terminal equipment, including a priority level definition table in which priority levels for the connection whose service category is a predetermined service are preset per a physical port, a control unit which transmits a control message including the priority levels when the connection is set up, and a switch controller for controlling a readout level of a user's information cell based on the priority levels;

second communication nodes, between the first communication node and the destination terminal equipment, including a switch controller which controls a readout level of the user's information cell of the connection based on the priority levels included in the control message as received.

2. The network system as claimed in claim 1, wherein the first communication node adjacent to the source terminal equipment has a multi-layer processing portion used in MAC address, and the priority level definition table is set per MAC address instead of the physical port.

3. The network system as claimed in claim 1, wherein the first communication node adjacent to the source terminal equipment has a multi-layer processing portion used in IP address, and the priority level definition table is set per IP address instead of the physical port.

4. The network system as claimed in claim 1, wherein the control message is based on a signaling protocol prescribed by a PNNI, and the priority levels correspond to predetermined values set in an Extended QoS Parameter which is an information element in the control message.

5. The network system as claimed in claim 4, wherein the priority levels are set in an End-to-End Transit Delay which is an information element in the control message instead of the Extended QoS Parameter.

6. The network system as claimed in claim 1, wherein the priority level definition table is set by a command input from a setting terminal connected to the first communication node adjacent to the source terminal equipment.

7. The network system as claimed in claim 2, wherein the priority level definition table is set by a command input from a setting terminal connected to the first communication node adjacent to the source terminal equipment.

8. The network system as claimed in claim 3, wherein the priority level definition table is set by a command input from a setting terminal connected to the first communication node adjacent to the source terminal equipment.

9. The network system as claimed in claim 1, wherein the switch controller has a weighted round robin scheduler which weighs a readout of the user's information cell of the connection corresponding to the priority levels and sequentially reads out the user's information cell.

10. The network system as claimed in claim 2, wherein the switch controller has a weighted round robin scheduler which weights a readout of the user's information cell of the connection corresponding to the priority levels and sequentially reads out the user's information cell.

11. The network system as claimed in claim 3, wherein the switch controller has a weighted round robin scheduler which weights a readout of the user's information cell of the connection corresponding to the priority levels and sequentially reads out the user's information cell.

12. The network system as claimed in claim 1, wherein all of the communication nodes further comprise a connection/priority level table in which the priority levels are set per connection.

13. The network system as claimed in claim 2, wherein all of the communication nodes further comprise a connection/priority level table in which the priority levels are set per connection.

14. The network system as claimed in claim 3, wherein all of the communication nodes further comprise a connection/priority level table in which the priority levels are set per connection.

15. A communication node comprising:

when provided adjacent to a source terminal equipment;

a priority level definition table, set per MAC address, in which priority levels for the connection whose service category is a predetermined service are preset per MAC address;

a control unit which transmits a control message including the priority levels when a connection is set up;

a switch controller for controlling a readout level of a user's information cell based on the priority levels; and a multi-layer processing portion used in a MAC address.

16. A communication node comprising:

when provided adjacent to a source terminal equipment;

a priority level definition table, set per IP address, in which priority levels for the connection whose service category is a predetermined service are preset per IP address;

a control unit which transmits a control message including the priority levels when a connection is set up;

a switch controller for controlling a readout level of a user's information cell based on the priority levels; and a multi-layer processing portion used in an IP address.

17. A communication method comprising:

adjacent to a source terminal equipment;

presetting priority levels for a connection whose service category is a predetermined service, per a physical port;

transmitting a control message including the priority levels when a connection is set up; and controlling a readout level of a user's information cell based on the priority levels; and between a communication node and a destination terminal equipment, controlling a readout level of the user's information cell of the connection based on the priority levels included in the control message as received.

* * * * *